April 29, 1930.  C. A. JOHNSON  1,756,361
OUTLET BOX MOUNTING
Filed Sept. 11, 1926
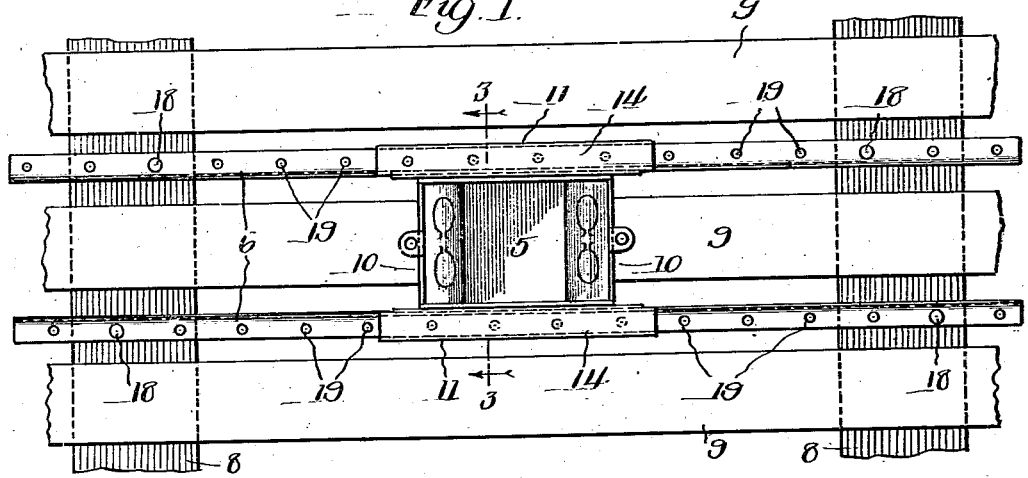
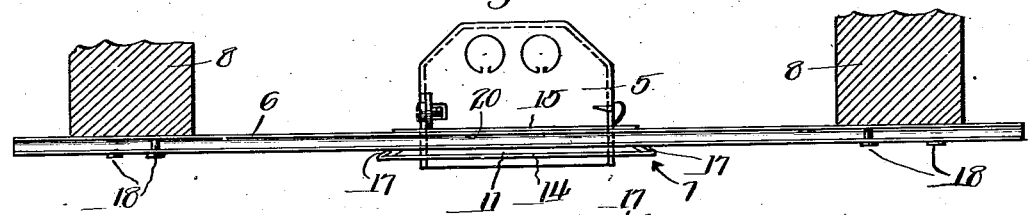
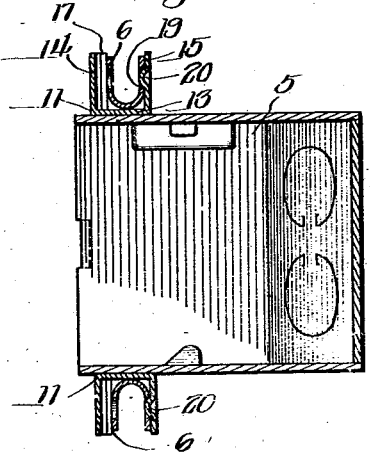
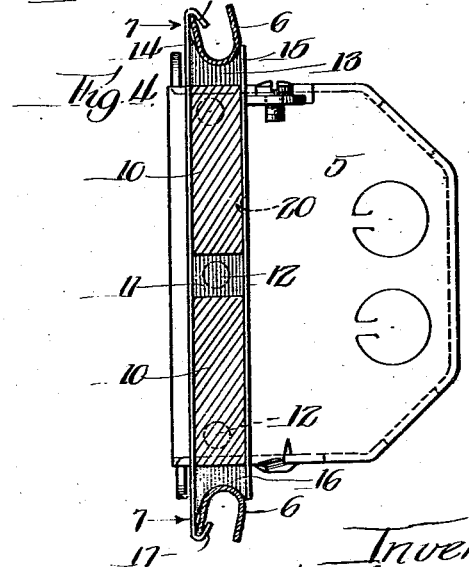
Inventor:
Chester A. Johnson, Patented Apr. 29, 1930

1,756,361

UNITED STATES PATENT OFFICE

CHESTER A. JOHNSON, OF CHICAGO, ILLINOIS, ASSIGNOR TO JEFFERSON ELECTRIC COMPANY, OF CHICAGO, ILLINOIS, A CORPORATION OF ILLINOIS

OUTLET-BOX MOUNTING

Application filed September 11, 1926. Serial No. 134,770.

This invention relates generally to electric outlet boxes and pertains more particularly to a mounting means for switch boxes comprising a means for securing the box between parallel supporting bars at a point removed from a fixed support.

This invention is related to that disclosed in my copending application Serial No. 117,277, filed June 21, 1926, and comprises a novel improvement thereon. Frequently, in the installation of a series of outlet boxes in a building under construction, it is advantageous to install some of the boxes in a horizontal instead of the usual vertical position. Heretofore this has necessitated the provision of two separate means of mounting the boxes, one for vertical positions and the other for horizontal. Obviously, in a device of this type, simplicity of construction and operation are most desirable. It is an object of this invention, therefore, to provide an outlet box mounting in which the box is provided with members arranged to engage supporting bars either in a vertical or horizontal position of the box.

A further object of the invention is to provide a means for supporting a box in one position which means may be used to receive and to support the intercepted laths in a wall when the box is mounted in the other position.

Another object is to provide a novel means for mounting an outlet box on supporting bars including a resilient interlock therebetween.

A more specific object is to provide an improved outlet box mounting comprising a pair of bar-engaging members arranged to engage a pair of supporting bars in one manner when the box is in a vertical position, said members being adapted to receive or engage the supporting bars in a different manner when the box is in a horizontal position.

Other objects and advantages will become apparent from the following description and the attached drawings, in which:

Figure 1 represents an outlet box mounted horizontally between the studs of a wooden lath wall.

Fig. 2 is a plan view of the same.

Fig. 3 is an enlarged section taken on a line 3—3 of Fig. 1.

Fig. 4 is an enlarged view of the outlet box showing the manner in which the box is vertically mounted in the wall.

While I have shown in the drawings and will herein describe in detail one embodiment of the invention for purposes of illustration, it is to be understood that I do not intend to be limited thereby to the form disclosed, but aim to cover all modifications and alternative constructions falling within the spirit and scope of the appended claims.

I have shown for the purpose of illustrating my invention, a combination similar to that disclosed in the aforementioned copending application, which comprises a switch box 5, parallel supporting bars 6, and bar engaging means carried by the box and generally designated as 7. The wall in which the box is mounted comprises, as shown in Fig. 1, spaced upright studs 8 and wooden laths 9, some of which are intercepted by the box in mounted position, thus presenting free projecting lath ends 10. Channel members 11 which in the vertical mounting of the box are used to support the free ends 10 of the laths, are suitably secured to the sides of the box, as by spot welds 12. These channel members comprise a bottom portion 13, a front side 14, and a rear side 15, all three parts extending beyond each end of the box to form the bar engaging means 7 by which the box is mounted in its vertical position. The means by which the outlet box is supported between the studs comprises the pair of supporting bars 6 of any suitable construction which preferably take the form of a U-shaped channel bar mounted with the openings therein directed away from each other. As set forth in detail in the copending application, each channel member 11 is recessed as at 16 to receive the supporting bars 6. The front sides 14 of the channel members are substantially longer than the back sides 15 and have the ends 17 turned inwardly to provide hooks which are adapted to engage the remote edges of the supporting bars, as fully explained in my said copending application.

The means by which I prefer to mount the box in the horizontal position comprises an interengagement between the supporting bars 6 and the channel members 11, and which utilizes an inherent resiliency in the bars and channel members to maintain the interengagement. As shown in Fig. 1, the supporting bars are mounted on the studs in any suitable manner, as by nails 18 driven through any one of a plurality of regularly spaced openings 19 in and extending throughout the length of the supporting bars. The means which engages one of the openings 19 may be any suitable means and herein comprises, as shown in Fig. 3, a projection or nib 20 stamped in the rear side 15 of the channel member 11 projecting inwardly thereof and adapted to engage any of the openings 19 in the supporting bars 6. As both the channel members and the supporting bars are preferably constructed from relatively thin metal, there will be a certain amount of resiliency in each of these members. By correctly proportioning the widths of the channel members and the supporting bars, the supporting bar is adapted to fit snugly into the channel member, the supporting bar being firmly held against the rear side 15 thereof by the resilient action of the overturned ends 17 on the front side 14. Thus, when the supporting bar has entered the channel member in such manner that one of the openings 19 engages the nib 20, a resilient interlocking engagement therebetween will be effected.

A comparison of Figs. 1 and 4 will show clearly that the channel member 11 serves a dual purpose. In the vertical position of the box (Fig. 4) the channel member serves as a means to receive and support the severed ends 10 of the lath intercepted by the box. In the horizontal position of the box (Fig. 1) the lath supporting channel member provides the means on the box which engages the supporting bars to mount the box. Thus, in neither position of the box is the channel member inactive.

It will be seen that I have provided a mounting for an outlet box which, in addition to being an effective means of mounting the outlet box in vertical position, is also an effective means for mounting the box in a horizontal position.

I claim as my invention:

1. A box mounting having in combination, a box, a pair of supporting bars adapted to be mounted in a wall, means on said box arranged to engage said bars for mounting said box in a vertical position, and a second mounting means associated with said first mentioned means arranged to interengage said bars for mounting and securing said box in a horizontal position.

2. A box mounting having, in combination, a box, a pair of supporting members, means on said box adapted to engage said members to mount said box in one position, and means on said member-engaging means arranged for interengagement with said bars to mount said box in a second position.

3. A box mounting having, in combination, a box, a pair of supporting bars each having a plurality of spaced openings therein, bar engaging means on said box including a pair of channel members having thereon ends arranged to engage said bars to secure said box thereto in one position, and means on said channel members including a projection therein adapted to enter one of said openings in said bar when said bar is inserted in said channel member, said bar and channel member being constructed to hold resiliently said projection in said opening.

4. A box mounting comprising, in combination, a box, a pair of substantially U-shaped supporting bars having a plurality of longitudinally spaced openings therein, a pair of channel members secured one to each side of said box, said channel members and said supporting bars being formed of a resilient material and of dimensions to permit said bars to fit snugly into said channels, and a nib on each channel member projecting into said channels and arranged to engage one of said openings in each supporting bar and to be held therein by the resilient coaction of said bars and said channel members.

5. A box mounting comprising, in combination, a box, a pair of channel members rigid with said box, a projection on one of said channel members extending into the channel thereof, and a pair of supporting bars arranged to fit snugly into said channel members, one of said bars having an opening intermediate the ends thereof adapted to engage said projection, said channel member and bar which have said projection and opening being flexible to exert a force during engagement therebetween for holding said projection in said opening to lock said box on said supporting bars.

6. A box mounting comprising, in combination, a box, a pair of channel members secured thereto, a pair of supporting bars having an opening in each, said bars or said channel members being resilient and being constructed to fit snugly one into the other, so that the spring action therebetween tends to hold the two together, and means adapted to engage said openings in said bars to provide an interlock between said box and said supporting bars.

7. A box mounting having, in combination with a box adapted to be mounted in a wall in a vertical or a horizontal position, a pair of supporting members therefor, and means on said box adapted when the box is mounted in one position to receive and support parts of said wall intercepted by said box, said means being also adapted positively and interlockingly to engage said supporting members when said box is mounted in the other position.

8. A box mounting of the character described having in combination with a box to be mounted in a wall, a pair of parallel supporting bars adapted to be attached to a fixed support, a pair of channel members secured to opposite sides of the box, each member having a hook at each end thereof, the hooks at opposite ends of said members engaging the edges of the respective supporting bars for supporting the box in one position, in which position said channel members are adapted to receive the ends of laths intercepted by the box, said channel members also being adapted to receive and embrace said supporting bars respectively for supporting the box in another position.

9. A box mounting having, in combination with a box adapted to be mounted in a wall in a vertical or a horizontal position, a pair of supporting members therefor, means projecting beyond opposite sides of said box positively to engage said supporting members and mount said box in one position in said wall, and other means intermediate said first mentioned engaging means positively to engage said supporting members and mount said box in the other position in said wall.

10. A box mounting having, in combination with a box adapted to be mounted in a wall in a vertical or a horizontal position, a pair of supporting members therefor, and a pair of channel members on opposite sides of said box, said channel members including means for engaging said supporting members in one position of said box, and having other means for engaging said supporting members in the other position of said box.

11. A box mounting having, in combination with a box adapted to be mounted in a wall in a vertical or a horizontal position, a pair of supporting members therefor, a pair of channel members on said box, hooks on the ends of said channel members for engaging said supporting members to mount said box in one position, and means providing an interengagement between said channel members and said supporting members to mount said box in the other position.

In testimony whereof, I have hereunto affixed my signature.

CHESTER A. JOHNSON.